US008663765B2

(12) United States Patent
Skillman et al.

(10) Patent No.: US 8,663,765 B2
(45) Date of Patent: *Mar. 4, 2014

(54) POLYMER HAVING UNSATURATED CYCLOALIPHATIC FUNCTIONALITY AND COATING COMPOSITIONS THEREFROM

(71) Applicant: Valspar Sourcing, Inc., Minneapolis, MN (US)

(72) Inventors: Charles Skillman, Zelienople, PA (US); Paul E. Share, Ann Arbor, MI (US); Greg Paulson, Slippery Rock, PA (US); Richard H. Evans, Wexford, PA (US); Benoit Prouvost, L'Abergement de Cuisery (FR); Paul Stenson, Avon, CT (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/833,233

(22) Filed: Mar. 15, 2013

(65) Prior Publication Data

US 2013/0211001 A1 Aug. 15, 2013

Related U.S. Application Data

(63) Continuation of application No. 13/267,928, filed on Oct. 7, 2011, now Pat. No. 8,449,960, which is a continuation-in-part of application No. PCT/US2010/030584, filed on Apr. 9, 2010.

(60) Provisional application No. 61/168,138, filed on Apr. 9, 2009.

(51) Int. Cl.
*B29D 22/00* (2006.01)
*B29D 23/00* (2006.01)
*B32B 1/08* (2006.01)
*B32B 15/08* (2006.01)

(52) U.S. Cl.
USPC .......................................... 428/35.8; 524/539

(58) Field of Classification Search
USPC .......................................... 428/35.8; 524/539
See application file for complete search history.

(56) References Cited

U.S. PATENT DOCUMENTS

| | | | |
|---|---|---|---|
| 3,166,434 A | 1/1965 | Gauger, Jr. |
| 3,306,868 A | 2/1967 | Adrian, Jr. |
| 3,333,022 A | 7/1967 | Reiners et al. |
| 3,340,327 A | 9/1967 | Spellberg et al. |
| 3,343,806 A | 9/1967 | Bobo et al. |
| 3,448,066 A | 6/1969 | Parker |
| 3,477,996 A | 11/1969 | Formaini |
| 3,674,727 A | 7/1972 | Fekete et al. |
| 3,867,480 A | 2/1975 | Fujiyoshi et al. |
| 3,919,063 A | 11/1975 | Maruyama et al. |
| 3,933,757 A | 1/1976 | Pratt et al. |
| 3,965,059 A | 6/1976 | Kerridge et al. |
| 3,986,992 A | 10/1976 | Canning et al. |
| 3,988,288 A | 10/1976 | Yamauchi et al. |
| 4,010,130 A | 3/1977 | Matsuo et al. |
| 4,073,827 A | 2/1978 | Okasaka et al. |
| 4,167,542 A | 9/1979 | Nelson |
| 4,206,291 A | 6/1980 | Takahashi et al. |
| 4,340,519 A | 7/1982 | Kotera et al. |
| 4,360,647 A | 11/1982 | Hefner, Jr. |
| 4,443,580 A | 4/1984 | Hefner, Jr. |
| 4,452,954 A | 6/1984 | Shade et al. |
| 4,522,977 A | 6/1985 | Gardner |
| 4,631,320 A | 12/1986 | Parekh et al. |
| 4,777,196 A | 10/1988 | Hefner, Jr. |
| 5,198,471 A | 3/1993 | Nauman et al. |
| 5,242,994 A | 9/1993 | Nield et al. |
| 5,252,682 A | 10/1993 | Bayha |
| 5,278,282 A | 1/1994 | Nauman et al. |
| 5,288,805 A | 2/1994 | Kodali |
| 5,290,828 A | 3/1994 | Craun et al. |
| 5,314,751 A | 5/1994 | Nield et al. |
| 5,693,715 A | 12/1997 | Kodali |
| 5,739,215 A | 4/1998 | Westerhof et al. |
| 5,916,979 A | 6/1999 | Koegler et al. |
| 6,048,949 A | 4/2000 | Muthiah et al. |
| 6,069,187 A | 5/2000 | Kusumoto et al. |
| 6,258,897 B1 | 7/2001 | Epple et al. |
| 6,306,934 B1 | 10/2001 | Bode et al. |
| 6,413,648 B1 | 7/2002 | Heyenk et al. |
| 6,472,480 B1 | 10/2002 | Anderson |
| 6,512,025 B2 | 1/2003 | Choudhery |
| 6,710,151 B2 | 3/2004 | Kuwatsuka et al. |
| 6,818,151 B2 | 11/2004 | Yang et al. |
| 6,893,678 B2 | 5/2005 | Hirose et al. |
| 6,930,161 B2 | 8/2005 | Schwarte et al. |
| 6,974,631 B2 | 12/2005 | Hayes et al. |
| 7,198,849 B2 | 4/2007 | Stapperfenne et al. |
| 7,244,506 B2 | 7/2007 | Hayes et al. |
| 7,247,390 B1 | 7/2007 | Yang et al. |
| 7,326,752 B2 | 2/2008 | McAlvin et al. |
| 7,517,559 B2 | 4/2009 | Thiebes et al. |
| 7,763,323 B2 | 7/2010 | Mayr et al. |
| 8,367,171 B2 | 2/2013 | Stenson et al. |
| 2003/0064185 A1 | 4/2003 | Mazza et al. |
| 2004/0044117 A1 | 3/2004 | Kiefer-Liptak et al. |

(Continued)

FOREIGN PATENT DOCUMENTS

AU 654600 6/1993
DE 2245110 9/1972

(Continued)

OTHER PUBLICATIONS

International Search Report and Written Opinion for corresponding International Application No. PCT/US2010/030576 mailed on Jul. 2, 2010 (9 pages).

(Continued)

Primary Examiner — Michael C Miggins

(57) ABSTRACT

A polymer is provided that preferably includes at least one unsaturated cycloaliphatic group. In one embodiment, the polymer is combined with an optional crosslinker and an optional carrier to form a coating composition suitable for use in coating articles such as packaging articles. In one embodiment, the polymer has at least one unsaturated cycloaliphatic group that is at least bicyclic.

20 Claims, No Drawings

(56) References Cited

U.S. PATENT DOCUMENTS

| | | |
|---|---|---|
| 2004/0134824 A1 | 7/2004 | Chan et al. |
| 2004/0198941 A1 | 10/2004 | Schwarte et al. |
| 2005/0038162 A1 | 2/2005 | Kuhlmann et al. |
| 2005/0129847 A1 | 6/2005 | Thiebes et al. |
| 2005/0196629 A1 | 9/2005 | Bariatinsky et al. |
| 2006/0093768 A1 | 5/2006 | Parekh et al. |
| 2006/0100366 A1 | 5/2006 | O'Brien et al. |
| 2006/0149019 A1 | 7/2006 | Wamprecht et al. |
| 2007/0281179 A1 | 12/2007 | Ambrose et al. |
| 2008/0015302 A1 | 1/2008 | Kiefer-Liptak et al. |
| 2008/0262613 A1 | 10/2008 | Gogolewski |
| 2010/0051862 A1 | 3/2010 | Share et al. |
| 2010/0056726 A1 | 3/2010 | Payot et al. |
| 2010/0260954 A1 | 10/2010 | Stenson et al. |
| 2011/0290696 A1 | 12/2011 | Stenson et al. |
| 2012/0058354 A1 | 3/2012 | Hayes et al. |
| 2012/0125799 A1 | 5/2012 | Doreau et al. |
| 2013/0189463 A1 | 7/2013 | Stenson et al. |

FOREIGN PATENT DOCUMENTS

| | | |
|---|---|---|
| EP | 0548727 | 12/1992 |
| EP | 0583777 | 2/1994 |
| EP | 0780455 | 6/1997 |
| EP | 1474490 | 2/2003 |
| EP | 1498461 | 5/2004 |
| EP | 1627898 | 2/2006 |
| GB | 1280404 | 10/1972 |
| WO | 9407932 | 4/1994 |
| WO | 9519379 | 7/1995 |
| WO | 9726304 | 7/1997 |
| WO | 2004013240 | 2/2004 |
| WO | 2008036629 | 3/2008 |
| WO | 2009117330 | 9/2009 |
| WO | 2010055019 | 5/2010 |
| WO | 2010118356 | 10/2010 |

OTHER PUBLICATIONS

International Search Report and Written Opinion for corresponding International Application No. PCT/US2010/030584 mailed on Jul. 12, 2010 (12 pages).

Matasa, Claude G., The Orthodontic Materials Insider, Dec. 2004, vol. 16, No. 4, Ortho-Cycle Co., Hollywood, FL USA (8 pages).

Smith, P.L., et al., The Use of Dicyclopentadiene in Polyesters, The Society of the Plastics Indistry, Inc., 22 Annual Meeting of the Reinforced Plastics Division in Washington, D.C., USA, Jan. 31, Feb. 1-3, 1967 (13 pages).

Evonik Degussa DYNAPOL I 912 Polyester Resin Product Information, obtained from www.matweb.com (1 page).

New Food Contact Approval, Smart Formulating Journal, Apr. 2010, Issue 7, p. 6, Evonik Degussa GmbH, Essen Germany (6 pages).

POLYMER HAVING UNSATURATED CYCLOALIPHATIC FUNCTIONALITY AND COATING COMPOSITIONS THEREFROM

CROSS REFERENCE TO RELATED APPLICATION

This application is a continuation of U.S. application Ser. No. 13/267,928, filed Oct. 7, 2011, now U.S. Pat. No. 8,449,960, which itself is a continuation-in-part application of PCT/US2010/030584 filed on Apr. 9, 2010, entitled "Polymer Having Unsaturated Cycloaliphatic Functionality and Coating Compositions Formed Therefrom," which claims priority to U.S. Provisional Application Ser. No. 61/168,138 filed on Apr. 9, 2009, entitled "Polyester Polymer Having Unsaturated Cycloaliphatic Functionality and Coating Composition Formed Therefrom," each of which are incorporated herein by reference in their entirety.

TECHNICAL FIELD

This invention relates to a polymer, and coating compositions including the polymer.

BACKGROUND

The application of coatings to metals to retard or inhibit corrosion is well established. This is particularly true in the area of packaging containers such as metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid.

Packaging coatings should preferably be capable of high-speed application to the substrate and provide the necessary properties when hardened to perform in this demanding end use. For example, the coating should be safe for food-contact, not adversely affect the taste of the packaged food or beverage product, have excellent adhesion to the substrate, resist staining and other coating defects such as "popping", "blushing" and/or "blistering," and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including epoxy-based coatings and polyvinylchloride-based coatings. Each of these coating types, however, has potential shortcomings. For example, the recycling of materials containing polyvinyl chloride or related halide-containing vinyl polymers can be problematic. There is also a desire by some to reduce or eliminate certain epoxy compounds commonly used to formulate food-contact epoxy coatings.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has typically been a tradeoff between corrosion resistance and fabrication properties for such coatings. Polyester-based coatings suitable for food-contact that have exhibited both good fabrication properties and an absence of crazing having tended to be too soft and exhibit unsuitable corrosion resistance. Conversely, polyester-based coatings suitable for food-contact that have exhibited good corrosion resistance have typically exhibited poor flexibility and unsuitable crazing when fabricated.

What is needed in the marketplace is an improved binder system for use in coatings such as, for example, packaging coatings.

SUMMARY

In one aspect, the present invention provides a binder system comprising a polymer having an unsaturated cycloaliphatic group preferably including a double bond, more preferably a carbon-carbon bond, located between atoms of a ring. The polymer typically includes at least one, and more preferably a plurality, of backbone and/or pendant unsaturated cycloaliphatic groups. In one embodiment, at least one of the unsaturated cycloaliphatic groups is at least bicyclic (i.e., polycyclic) and more preferably bicyclic. The polymer may have any suitable backbone configuration. In preferred embodiments, the backbone includes at least one heteroatom, with polyester, polyether, polyurethane, and copolymers thereof, being particularly preferred backbone configurations. In a presently preferred embodiment, the polymer is a polyester polymer, which may optionally include step-growth linkages other than ester linkages such as, e.g., urethane linkages, that has a glass transition temperature of preferably at least 0° C., more preferably at least 20° C. and includes one or more unsaturated at least bicyclic groups.

In another aspect, the invention provides a coating composition useful for coating a wide variety of articles, including metal articles such as, for example, metal packaging articles. Certain preferred coating compositions of the invention are particularly useful for coating metal food or beverage cans, including use as interior-food-contact coating surfaces thereon. The coating composition typically includes a binder polymer of the invention (preferably in at least a film-forming amount), an optional crosslinker, and an optional carrier. In a presently preferred embodiment, the optional crosslinker includes at least one phenolic crosslinker, more preferably at least one resole phenolic crosslinker. In some embodiments, the polymer of the invention may be self-crosslinking.

In yet another aspect, the invention provides an article coated on at least a portion of one surface with a coating composition described herein. In certain embodiments, the coated article comprises a packaging article such as a metal food or beverage can, or a portion thereof, having at least a portion of a major surface of a metal substrate (e.g., a metal substrate of a body portion and/or end portion) coated with a coating composition of the invention.

In yet another aspect, the invention provides a method for producing a coated article. The method includes providing a coating composition described herein and applying the coating composition on at least a portion of a substrate (typically a planar metal substrate) prior to, or after, forming the substrate into a packaging article such as a food or beverage can or a portion thereof.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and from the claims.

SELECTED DEFINITIONS

Unless otherwise specified, the following terms as used herein have the meanings provided below.

The term "aliphatic group" means a saturated or unsaturated linear or branched hydrocarbon group, which can include optional elements other than carbon and hydrogen. This term is used to encompass alkyl, alkenyl, and alkynyl groups, for example. The term "cyclic group" means a closed ring hydrocarbon group that is classified as a cycloaliphatic group or an aromatic group, both of which can include heteroatoms. The term cycloaliphatic group means an organic group that contains a ring that is not an aromatic group.

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be so substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "substantially free" of a particular mobile compound means that the compositions of the invention contain less than 100 parts per million (ppm) of the recited mobile compound. The term "essentially free" of a particular mobile compound means that the compositions of the invention contain less than 10 ppm of the recited mobile compound. The term "essentially completely free" of a particular mobile compound means that the compositions of the invention contain less than 1 ppm of the recited mobile compound. The term "completely free" of a particular mobile compound means that the compositions of the invention contain less than 20 parts per billion (ppb) of the recited mobile compound.

The term "mobile" means that the compound can be extracted from the cured coating when a coating (typically ~1 mg/cm$^2$ (6.5 mg/in$^2$) thick) is exposed to a test medium for some defined set of conditions, depending on the end use. An example of these testing conditions is exposure of the cured coating to HPLC-grade acetonitrile for 24 hours at 25° C. If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

The term "crosslinker" refers to a molecule capable of forming a covalent linkage between polymers or between two different regions of the same polymer.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers and copolymers (e.g., polyester-urethane polymers).

The term "unsaturation" when used in the context of a compound refers to a compound that includes at least one non-aromatic double bond.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one aspect, the invention provides a polymer having unsaturated cycloaliphatic ("UC") functionality. As used herein, the phrase "unsaturated cycloaliphatic" or "UC" refers to a group that (i) includes one or more unsaturated cycloaliphatic groups and (ii) may include one or more other groups (e.g., as substituents of the unsaturated cycloaliphatic group). As such, the term includes both unsaturated monocyclic groups and unsaturated polycyclic groups. The polymer preferably includes at least one, and more preferably a plurality, of backbone or pendant UC groups having a double bond located between atoms of a ring, which is preferably a substituted or unsubstituted hydrocarbon ring that may include one or more heteroatoms in the ring.

Typically, the double bond is a carbon-carbon double bond, although other types of double bonds (such as, for example, carbon-oxygen ("C=O"), carbon-nitrogen ("C=N"), nitrogen-nitrogen ("N=N"), and nitrogen-oxygen (N=O) double bonds) may have utility in certain embodiments. In some embodiments, the UC group includes two or more double bonds, more typically two or more carbon-carbon double bonds.

In another aspect, the invention is a coating composition that includes the UC-functional polymer, preferably in a film-forming amount. While coating compositions other than food-contact coating compositions are within the scope of this invention, preferred coating compositions of the invention are suitable for use as food-contact coatings. It is further contemplated that the coating composition of the invention may have utility in a variety of other coating end uses, including, other packaging coating applications such as, e.g., pharmaceutical or medical packaging coating applications; industrial coating applications such as, e.g., appliance coatings; coatings for interior or exterior steel building products; HVAC coating applications; coatings for agricultural metal products; wood coatings; etc.

The coating composition of the invention preferably includes a UC-functional polymer, an optional crosslinker (preferably a phenolic crosslinker), and an optional liquid carrier. The coating composition preferably also includes a catalyst (such as, e.g., an acid catalyst) to enhance curing and/or crosslinking. Although coating compositions including a liquid carrier are presently preferred, it is contemplated that the UC-functional polymer of the invention may have utility in other coating application techniques such as, for example, powder coating.

The UC-functional polymer of the invention may have any suitable backbone configuration. Different monomer blocks may be chosen depending on the intended application, including the desired properties of the final product, the expected use of the polymer composition, the other materials with which the polymer composition will be mixed or come into contact, or the type of polymer desired. In presently preferred embodiments, the backbone includes one or more heteroatoms (e.g., oxygen, nitrogen, silicon, sulfur, phosphorus, etc.), with nitrogen and oxygen being preferred heteroatoms. Step-growth backbones (i.e., polymer backbones formed through a step-growth polymerization process such as, for example, a condensation polymerization process) are preferred backbones, with condensation backbones being particularly preferred. Non-limiting examples of suitable backbones including one or more heteroatoms include polyester, polyether, polyurethane, and copolymer backbones thereof (e.g., polyester-urethane backbones, polyester-ether backbones, etc.). Some non-limiting examples of polyester-urethane polymers are disclosed in International Application No. PCT/US2009/065848 filed on Nov. 25, 2009 and entitled "Polyester Polymer and Coating Compositions Thereof". If desired, the backbones may include one or more oligomer or polymer segments formed via a chain growth (or addition) polymerization process.

A polyester backbone is particularly preferred. The polyester backbone may optionally include other step-growth linkages such as, for example, urethane linkages. In some embodiments where a polyester backbone is employed, the backbone is free of urethane linkages and/or other non-ester step-growth linkages.

Conventional food-contact, polyester-based packaging coatings have typically been based on a mixture of a polyester polymer and crosslinking resin. Such polyesters have typically included relatively few reactive hydroxyl groups and, moreover, the reactive groups of the crosslinking resins have not typically exhibited a high propensity to enter into crosslinking reactions with the hydroxyl groups of the polyester. Upon curing, relatively few crosslinks are believed to be formed between the polyester and the crosslinking resin, which is thought to result in a network of self-crosslinked crosslinker resins having unreacted polyester polymer dispersed therein. Such conventional polyester coatings have suffered from a variety of performance issues such as poor chemical resistance, a lack of flexibility, and/or unsuitable crazing. (As used herein, the term "crazing" refers to specific coating defects that occur upon fabrication of a coated metal substrate.) While not intending to be bound by any theory, these coating defects are believed to be attributable to an increase in the crystallinity of coating materials that occurs between curing of the coating and fabrication of the coated article. Unlike conventional food-contact polyester coatings, preferred cured coatings of the invention exhibit a suitable balance of coating properties, including excellent corrosion resistance, excellent fabrication properties, and an absence of crazing.

While not intending to be bound by any theory, the superb balance of coating properties exhibited by certain preferred coating compositions of the invention (including, e.g., where the UC-functional polymer has a polyester backbone) is believed to be attributable, at least in part, to one or more of: (i) the reactivity of the UC groups of the polymer, (ii) the locating of crosslinking sites throughout the polymer (as opposed to merely at terminal ends as is typical for conventional polyesters) through incorporation of reactive UC groups, (iii) an increased number of crosslinking sites in the polymer, and/or (iv) the particular selection of crosslinker(s).

As discussed above, in preferred embodiments of the invention, the binder polymer includes one or more (e.g., $\geq 2$, $\geq 3$, $\geq 4$, $\geq 5$, $\geq 10$, etc.) backbone or pendant UC groups. Non-limiting examples of UC groups include: substituted or unsubstituted unsaturated C3-C13 rings and more typically substituted or unsubstituted C4-C9 rings (e.g., unsubstituted or substituted cyclobutenes, cyclopentenes, cyclopentadienes, cyclohexenes, cyclohexadienes, cycloheptenes, cycloheptadienes, cyclooctenes, cyclooctadienes, cyclononenes, cyclodecenes, cyclodecadienes, cycloundecenes, cyclododecenes, cyclotridecenes, and cyclononadienes, and combinations thereof), substituted or unsubstituted unsaturated polycyclic groups (i.e., at least bicyclic groups, more preferably bicyclic groups), and combinations thereof. In some embodiments, the aforementioned UC groups may include one or more heteroatoms (e.g., N, O, S, etc.) in a ring of the UC group. In some embodiments, it may be desirable for the UC group to include one or more allylic hydrogen attached to a carbon atom of the ring, where the carbon atom is adjacent to a double bond of the ring.

Unsaturated groups that are at least bicyclic (e.g., bicyclic, tricyclic, or higher order polycyclic groups), and more preferably bicyclic, are preferred UC groups. The at least bicyclic groups will typically include from 5 to 30 carbon atoms, more typically from 6 to 15 carbon atoms, and even more typically from 7 to 10 carbon atoms. The at least bicyclic groups may include one or more heteroatoms (e.g., N, O, S, etc.) in place of one or more of the aforementioned carbon atoms. The term "bicyclic" refers to a group that includes two cyclic groups in which one or more (and preferably two or more) atoms are present in the rings of both of the cyclic groups. Thus, for example, a group that consists of two cyclohexane groups connected by a single methylene linking group is not a bicyclic group or a polycyclic group.

While not intending to be bound by any theory, the carbon-carbon double bonds present in unsaturated bicyclic groups such as norbornene are believed to exhibit enhanced reactivity. The high level of ring strain present in certain unsaturated bicyclic groups (e.g., unsaturated "bridged" bicyclics such as norbornene) is believed to contribute to the enhanced reactivity. For further discussion of the reactivity of bicyclic compounds, see, for example, D. E. Van Sickel, F. R. Mayo, R. M. Arluck JACS (32)1967, 3680 "Bridging of the cyclohexane ring has thoroughly deactivated the allylic bridgehead hydrogen atoms and increased the reactivity of the double bond by 8 to ninefold." While also not intending to be bound by any theory, it is contemplated that enhanced reactivity (e.g., between the UC group and a crosslinker) may also be achieved using unsaturated ring groups other than bicyclic groups having appreciable ring strain and, more preferably, a level of ring strain greater than that of a cyclohexene group, and more preferably approaching or exceeding that of a norbornene group. While the ring strain present in such UC groups may be less than that of certain unsaturated bicyclic groups, it may be sufficient for certain end uses. Non-limiting examples of such strained ring groups include substituted or unsubstituted variants of the following: cyclopropene (e.g., 1,2-dimethylcyclopropene), cyclobutene, trans-cyclooctene, trans-cyclononene, cyclobutadiene, cyclopentadiene, 1,3-cyclohexadiene, 1,3-cycloheptadiene, 1,3-cyclooctadiene, 1,3-cyclononadiene, and 1,3-cyclodecadiene, and derivatives and combinations thereof. By way of example, a cyclohexene group is not typically considered to be a strained ring group. In the context of monocyclic ring system, rings including 3 to 5 atoms, and especially 3 or 4 atoms, tend to exhibit the greatest amount of total ring strain. Examples of such strained monocylic ring systems are included in the above list.

While not intending to be bound by any theory, in some embodiments, suitable strained ring groups will preferably have at least one double bond with a heat of hydrogenation greater than that of cyclohexene. In certain embodiments, the UC group (and preferably a carbon-carbon double bond of the UC group) has a heat of hydrogenation that is at least about as high as that of bicyclo[2.2.2]octene (e.g., −28.25 kcal/mole), and more preferably, at least about as high as that of bicyclo[2.2.1]heptene (e.g., −33.13 kcal/mole). As used herein, when a heat of hydrogenation is stated to be, for example, "at least X," "greater than X," or the like, it should be understood that reference is made to the absolute value of the heat of hydrogenation because heats of hydrogenation are typically reported as negative values, with a larger negative value indicating a higher heat of hydrogenation (e.g., −40 kcal/mole is a higher heat of hydrogenation than −10 kcal/mole). It is also contemplated that certain reactive aliphatic (or open chain) carbon-carbon double bonds may be substituted for some, or all, of the UC groups of the polymer. Suitable such groups may include carbon-carbon double bonds having, for example, a heat of hydrogenation that is (i) greater than that of cyclohexene or (ii) at least about as high as that of bicyclo[2.2.2]octene. Preferred reactive aliphatic carbon-carbon double bonds are capable of reacting under coating cure conditions described herein with a suitable crosslinker, such as for, example a resole phenolic crosslinker, to form a covalent linkage between the polymer and the crosslinker.

In one embodiment, the UC group includes a bicyclic structure represented by the IUPAC (International Union of Pure and Applied Chemistry) nomenclature Expression (I):

bicyclo[x.y.z]alkene

In Expression (I),
x is an integer having a value of 2 or more,
y is an integer having a value of 1 or more,
z is an integer having a value of 0 or more, and
the term alkene refers to the IUPAC nomenclature designation (e.g., hexene, heptene, heptadiene, octene, etc.) for a given bicyclic molecule and denotes that the bicyclic group includes one or more double bonds (e.g. ≥1, ≥2, ≥3 double bonds).

Preferably z in Expression (I) is 1 or more. In other words, preferred bicyclic groups include a bridge with a least one atom (typically one or more carbon atoms) interposed between a pair of bridgehead atoms, where the at least one atom is shared by at least two rings. By way of example, bicyclo[4.4.0]decane does not include such a bridge.

In preferred embodiments, x has a value of 2 or 3 (more preferably 2) and each of y and z independently have a value of 1 or 2.

Non-limiting examples of some suitable UC groups represented by Expression (I) include monovalent or polyvalent (e.g., divalent) variants of bicyclo[2.1.1]hexene, bicyclo[2.2.1]heptene (i.e., norbornene), bicyclo[2.2.2]octene, bicyclo[2.2.1]heptadiene, and bicyclo[2.2.2]octadiene. Bicyclo[2.2.1]heptene is a presently preferred UC group.

It is contemplated that the UC groups represented by Expression (I) may contain one or more heteroatoms (e.g., nitrogen, oxygen, sulfur, etc.) and may be substituted to contain one or more additional substituents. For example, one or more cyclic groups (including, e.g., pendant cyclic groups and ring groups fused to a ring of a bicyclic UC group) or acyclic groups may be attached to the bicyclic group represented by Expression (I). Thus, for example, in some embodiments the bicyclic group of Expression (I) may be present in a tricyclic or higher group.

If desired, UC-functional polymers of the invention may include non-cycloaliphatic unsaturation. For example, certain UC-functional polymers may include aliphatic unsaturation (i.e., open chain or linear unsaturation) and/or aromatic unsaturation.

Iodine value is a useful measure for characterizing the average number of non-aromatic double bonds present in a material. UC-functional polymers of the invention may have any suitable iodine value to achieve the desired result. In preferred embodiments, the UC-functional polymers have an iodine value of at least about 10, more preferably at least about 20, even more preferably at least about 35, and optimally at least about 50. The upper range of suitable iodine values is not limited, but in most embodiments the iodine value typically will not exceed about 120. Iodine values are typically expressed in terms of centigrams of iodine per gram of resin and may be determined, for example, using the methodology provided in the below Test Methods section.

In some embodiments, the UC-functional polymer includes a number of UC groups, and more preferably a number of unsaturated at least bicyclic groups (more preferably bicyclic), sufficient to yield an iodine value of at least 5, at least 10, at least 20, at least 35, or at least 50 (before factoring in the portion of the total iodine value of the polymer attributable to any other carbon-carbon double bonds that may be present in the polymer).

The UC-functional polymer of the invention may include any suitable number of UC groups. As discussed above, one useful measure of such groups is the number of such groups present in the polymer. Another useful measure is the weight percent of the UC groups relative to the total weight of the polymer. In certain preferred embodiments, the UC groups constitute at least about 5, more preferably at least about 15, and even more preferably at least about 30 weight percent ("wt-%") of the polymer. Preferably, the UC groups constitute less than about 95, more preferably less than about 75, and even more preferably less than about 50 wt-% of the polymer. In some embodiments, such as, for example, when open-chain unsaturation is incorporated into the polymer (e.g., using materials such as maleic acid or anhydride), an amount of UC groups less than that recited above may be used. In certain preferred embodiments, the UC-functional polymer includes a number of at least bicyclic groups, more preferably bicyclic groups, sufficient to yield a wt-% of at least bicyclic groups pursuant to that described above.

Caution should be exercised when interpreting the wt-% of UC groups because direct measurement of the weight of the UC groups may not be feasible. Accordingly, the aforementioned wt-%'s correspond to the total weight of (a) UC-containing monomers relative to (b) the total weight of the UC-functional polymer. Thus, for example, if an oligomer having a UC group is incorporated into the backbone of the polymer, the wt-% of UC group in the polymer is calculated using the weight of the monomer that includes the UC group (as opposed to the weight of the oligomer that includes the monomer). Similarly, if the polymer is formed and then a monomer of the preformed polymer is modified to include the UC group, then the wt-% of UC groups in the polymer is calculated using the weight of the modified monomer, which may be based on a theoretical calculation if necessary. For example, in some embodiments, bicyclic UC groups may be incorporated into the polymer via a Diels-Alder reaction of a conjugated diene component (e.g., cyclopentadiene and/or dicyclopentadiene) across a double bond of a monomer present in the backbone of the polymer (e.g., maleic acid and/or anhydride reacted into the polymer backbone). In this situation, the wt-% of UC groups in the polymer is determined using the weight of the resulting bicyclic-modified monomer present in the polymer (e.g., the weight of cyclopentadienized maleic anhydride).

In certain preferred embodiments, the UC group is connected to at least one other portion of the polymer via a step-growth linkage (e.g., a condensation linkage) such as, for example, an amide, carbamate, carbonate ester (—O—C (=O)—O—), ester, ether, urea, or urethane linkage group. A covalent linkage formed from, for example, an addition polymerization reaction (e.g., a free-radical-initiated addition polymerization such as a vinyl polymerization) is not considered a step-growth linkage. Ester linkages are presently preferred step-growth linkages. If desired, other organic linkage groups such as, for example, substituted or unsubstituted hydrocarbyl linking groups may also be used.

As previously discussed, in some preferred embodiments, the UC-functional polymer has a polyester backbone. In one such embodiment, the UC-functional polyester polymer includes at least one divalent backbone UC group that is connected on each end to another portion of the backbone via a step-growth linkage, more preferably an ester linkage.

In some embodiments, the binder polymer includes one or more divalent backbone segments having the structure —X—Z—X—, where: (i) each X is independently a step-growth linkage, and typically both X are the same type of step-growth linkage and (ii) Z is a divalent organic group that includes at least one unsaturated at least bicyclic group. In presently preferred embodiments, Z includes two or more carbon atoms in a chain connecting the two X groups, more preferably from 2 to 8, 2 to 6, or 2 to 4 such carbon atoms. In an embodiment, each X is an ester group oriented such that the —X—Z—X— segment has the structure —O—C(O)—Z—C(O)—O—.

In a presently preferred embodiment, Z includes two carbons atoms in the chain connecting the two X groups. An example of a preferred divalent —X—Z—X— group having two such carbon atoms is depicted below:

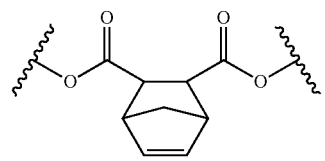 [SMILES: *OC(=O)C1C2C=CC(C2)C1C(=O)O*]

Suitable polyester polymers may be prepared using standard condensation reactions. The polyester polymer is typically derived from a mixture of at least one polyfunctional alcohol ("polyol") esterified with at least one polycarboxylic acid (or derivative thereof). In some embodiments, a transesterification polymerization or other process may be used. If desired, the polyester polymer may include polymer linkages (e.g., amide, carbamate, carbonate ester, ether, urea, urethane, etc.), side chains, and end groups not related to simple polyol and polyacid components.

Non-limiting examples of suitable polycarboxylic acids include dicarboxylic acids and polycarboxylic acids having higher acid functionality (e.g., tricarboxylic acids, tetracarboxylic acids, etc.) or anhydrides thereof, precursors or derivatives thereof (e.g., an esterifiable derivative of a polycarboxylic acid, such as a dimethyl ester or anhydride), or mixtures thereof. Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, isophthalic acid, trimellitic acid, terephthalic acid, naphthalene dicarboxylic acid, cyclohexane dicarboxylic acid, glutaric acid, dimer fatty acids, anhydrides or derivatives thereof, and mixtures thereof. If desired, adducts of polyacid compounds (e.g., triacids, tetraacids, etc.) and monofunctional compounds may be used. An example of one such adduct is pyromellitic anhydride pre-reacted with benzyl alcohol. It should be understood that in synthesizing the polyester, the specified acids may be in the form of anhydrides, esters (e.g., alkyl ester) or like equivalent form. For sake of brevity, such compounds are referred to herein as "carboxylic acids."

Non-limiting examples of suitable polyols include diols, polyols having 3 or more hydroxyl groups (e.g., triols, tetraols, etc.), and combinations thereof. Suitable polyols may include, for example, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis(p-phenylene-oxypropanol-2), and mixtures thereof. If desired, adducts of polyol compounds (e.g., triols, tetraols, etc.) and monofunctional compounds may be used. An example of one such adduct is dipentaerythritol pre-reacted with benzoic acid.

In some embodiments, the backbone of the polyester polymer is hydroxyl-terminated and/or carboxyl-terminated, more preferably hydroxyl-terminated.

The polyester polymer may include polymer segments other than polyester segments. Typically, however, at least 50 wt-% of the polyester will comprise polyester segments. In some embodiments, substantially all (e.g., >80 wt-%, >90 wt-%, >95 wt-%, etc.), or all, of the polyester comprises polyester segments.

The polyester polymer may have any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D1957-86 (Reapproved 2001) entitled "Standard Test Method for Hydroxyl Value of Fatty Oils and Acids" and available from the American Society for Testing and Materials International of West Conshohocken, Pa. In certain preferred embodiments, the polyester polymer has a hydroxyl number of from 0 to about 150, even more preferably from about 5 to about 100, and optimally from about 10 to about 80.

The polyester polymer may have any suitable acid number. Acid numbers are typically expressed as milligrams of KOH required to titrate a 1-gram sample to a specified end point. Methods for determining acid numbers are well known in the art. See, for example, ASTM D974-04 entitled "Standard Test Method for Acid and Base Number by Color-Indicator Titration" and available from the American Society for Testing and Materials International of West Conshohocken, Pa. The range of suitable acid numbers may vary depending on a variety of considerations including, for example, whether water-dispersibility is desired. In some embodiments, the polyester polymer has an acid number of at least about 5, more preferably at least about 15, and even more preferably at least about 30. Depending on the desired monomer selection, in certain embodiments (e.g., where a solvent-based coating composition is desired), the polyester polymer has an acid number of less than about 40, less than about 10, or less than about 5.

In some embodiments, the polymer includes one or more urethane linkages, and more preferably a plurality of urethane linkages (e.g., ≥2, ≥3, ≥4, ≥5, ≥10, etc.). Thus, for example, in some such embodiments, the polymer is a polyester-urethane polymer. Urethane linkages are typically formed by reacting ingredients that include one or more hydroxyl-functional compounds and one or more isocyanate-functional compounds. If desired, a polyester-urethane polymer may be formed, for example, through reaction of a polyester polyol and a diisocyanate or other polyisocyanate compound.

The isocyanate compound may be any suitable compound, including an isocyanate compound having 1 isocyanate group; a polyisocyanate compound having 2, 3, or 4 or more isocyanate groups; or a mixture thereof. Suitable diisocyanates may include isophorone diisocyanate (i.e., 5-isocyanato-1-isocyanatomethyl-1,3,3-trimethylcyclohexane); 5-isocyanato-1-(2-isocyanatoeth-1-yl)-1,3,3-trimethylcyclohexane; 5-isocyanato-1-(3-isocyanatoprop-1-yl)-1,3,3-trimethylcyclohexane; 5-isocyanato-(4-isocyanatobut-1-yl)-1,3,3-trimethylcyclohexane; 1-isocyanato-2-(3-isocyanatoprop-1-yl) cyclohexane; 1-isocyanato-2-(3-isocyanatoeth-1-yl) cyclohexane; 1-isocyanato-2-(4-isocy-anatobut-1-yl) cyclohexane; 1,2-diisocyanatocyclobutane; 1,3-diisocyanatocyclobutane; 1,2-diisocyanatocyclopentane; 1,3-diisocyanatocyclopentane; 1,2-diisocyanatocyclohexane; 1,3-diisocyanatocyclohexane; 1,4-diisocyanatocyclohexane; dicyclohexylmethane 2,4'-diisocyanate; trimethylene diisocyanate; tetramethylene diisocyanate; pentamethylene diisocyanate; hexamethylene diisocyanate; ethylethylene diisocyanate; trimethylhexane diisocyanate; heptamethylene diisocyanate; 2-heptyl-3,4-bis(9-isocyanatononyl)-1-pentyl-cyclohexane; 1,2-, 1,4-, and 1,3-bis(isocyanatomethyl)cyclohexane; 1,2-, 1,4-, and 1,3-bis(2-isocyanatoeth-1-yl)cyclohexane; 1,3-bis(3-isocyanatoprop-1-yl) cyclohexane; 1,2-, 1,4- or 1,3-bis(4-isocyanatobuty-1-yl) cyclohexane; liquid bis(4-isocyanatocyclohexyl)-methane; and derivatives or mixtures thereof.

In some embodiments, the isocyanate compounds are preferably non-aromatic. Non-aromatic isocyanates are particularly desirable for coating compositions intended for use on an interior surface of a food or beverage container. Isophorone diisocyanate (IPDI) and hexamethylene diisocyanate (HMDI) are preferred non-aromatic isocyanates.

If water-dispersibility is desired, the UC-functional polymer can be made water-dispersible using any suitable means, including the use of non-ionic water-dispersing groups, salt groups (e.g., anionic and/or cationic salt groups), surfactants, or a combination thereof. Preferred water-dispersible UC-functional polymers contain a suitable amount of salt-containing (e.g., anionic and/or cationic salt groups) and/or salt-forming groups to facilitate preparation of an aqueous dispersion or solution. Suitable salt-forming groups may include neutralizable groups such as acidic or basic groups. At least a portion of the salt-forming groups may be neutralized to form salt groups useful for dispersing the polymer into an aqueous carrier. Acidic or basic salt-forming groups may be introduced into the polymer by any suitable method.

Non-limiting examples of anionic salt groups include neutralized acid or anhydride groups, sulphate groups (—OSO$_3$—), phosphate groups (—OPO$_3^-$), sulfonate groups (—SO$_2$O$^-$), phosphinate groups (—POO$^-$), phosphonate groups (—PO$_3^-$), and combinations thereof. Non-limiting examples of suitable cationic salt groups include:

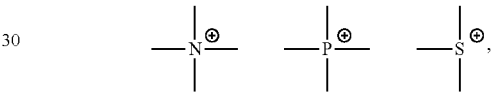

(referred to, respectively, as quaternary ammonium groups, quaternary phosphonium groups, and tertiary sulfate groups) and combinations thereof. Non-limiting examples of non-ionic water-dispersing groups include hydrophilic groups such as ethylene oxide groups. Compounds for introducing the aforementioned groups into polymers are known in the art.

In some embodiments, a water-dispersible UC-functional polymer may be achieved through inclusion of a sufficient number of carboxylic acid groups in the polymer. Non-limiting examples of suitable materials for incorporating such groups into the polymer include anhydrides or polyanhydrides such as tetrahydrophthalic anhydride, pyromellitic anhydride, pyromellitic dianhydride, succinic anhydride, trimilletic anhydride ("TMA"), and mixtures thereof. In one embodiment, a hydroxyl-terminated polyester polymer or oligomer having one or more pendant hydroxyl groups is reacted with an anhydride such as TMA to produce a hydroxyl-terminated polyester having carboxylic functionality. The conditions of the reaction are preferably controlled, including the temperature, to avoid gelling. The resulting carboxylic-functional polyester oligomer or polymer is neutralized (e.g., using a base such as an amine) to produce an aqueous dispersion. In some embodiments, it is contemplated that water-dispersibility may be provided through use of acid-functional ethylenically unsaturated monomers that have been grafted onto the polymer, whereby a suitable number of the acid-functional groups are neutralized with base (such as, e.g., a tertiary amine) to produce salt groups. See for example, U.S. Pat. App. No. 20050196629 for examples of such techniques.

The molecular weight of the UC-functional polymer of the invention can vary depending upon material choice and the desired end use. In preferred embodiments, the polymer has a number average molecular weight (Mn) of at least about 1,000, more preferably at least about 1,500, and even more preferably at least about 3,000. Preferably, the Mn of the polymer is less than about 20,000, more preferably less than about 15,000, and even more preferably less than about 10,000.

The desired glass transition temperature (Tg) may vary depending upon a variety of factors, including, for example, the structure of the UC-functional polymer, the desired molecular weight of the UC-functional polymer and the desired end use. In embodiments where the UC-functional polymer is a polyester polymer and the coating composition is intended for use an interior food-contact coating of a packaging article, the UC-functional polymer preferably has a Tg that is sufficiently high such that the cured film exhibits good corrosion resistance. Such UC-functional polyester polymers preferably have a Tg of at least 0° C., more preferably at least 15° C., even more preferably at least 20 or 25° C. Although the Tg is not especially limited on the upper end, such UC-functional polyester polymers typically have a Tg of less than about 170° C., more typically less than about 150° C., and even more typically less than about 130° C.

Preferred UC-functional polymers of the present invention include a plurality of aromatic groups, with aromatic polyesters being particularly preferred. Preferred aromatic UC-functional polymers include at least about 5 wt-%, more preferably at least about 10 wt-%, even more preferably at least about 15 wt-%, and even more preferably at least about 20 wt-% of aromatic groups. In some embodiments, the UC-functional polymer may include up to 75 wt-% or more of aromatic groups. The aforementioned wt-%'s correspond to the total weight of aromatic monomers used to form the UC-functional polymer relative to the total weight of the reactants used to form polymer. Thus, for example, if an oligomer having an aromatic group is incorporated into the UC-functional polymer, the wt-% of the aromatic group in the polymer is calculated using the weight of the aromatic monomer used to form the oligomer (as opposed to the weight of the oligomer). Suitable aromatic monomers include, for example, acid-, ester-, or anhydride-functional aromatic monomers (e.g., aromatic monoacids and/or polyacids, more preferably aromatic polyacids); hydroxyl-functional aromatic monomers (e.g., aromatic mono- and/or poly-functional monomers); or aromatic monomers having one or more (typically at least two) reactive groups capable of participating in a condensation reaction with a complimentary reactive group (more preferably, a hydroxyl, carboxylic acid, ester, or anhydride groups) to form a covalent linkage. Examples of suitable aromatic monomers include terephthalic acid, isophthalic acid, phthalic acid, phthalic anhydride, trimellitic anhydride, trimellitic acid, dimethyl terephthalate, dimethyl isophthalate, dimethyl phthalate, 5-sodiosulpho isophthalic acid, naphthalic acid, 1,8-naphthalic anhydride, dimethyl naphthalate, pyromellitic dianhydride, and derivatives and combinations thereof.

In some embodiments, the UC-functional polymer of the present invention is preferably free or appreciably free of fatty acids, oils, and/or other long-chain hydrocarbons. It is believed that the use of unsuitable amounts of such materials may impart undesirable off-tastes or odors to packaged food or beverage products that are kept in prolonged contact with the coating compositions of the present invention. In addition, the presence of unsuitable amounts of such materials in the UC-functional polymer may cause the corrosion resistance of coating compositions of the present invention to be unsuitable for certain end uses, especially for packaging coatings intended for use with so called "hard-to-hold" food or beverage products. In presently preferred embodiments, the UC-functional polymer of the present invention includes no more than 10 wt-%, more preferably no more than 3 wt-%, and even more preferably no more than 1 wt-% of fatty acids, oils, or other long-chain hydrocarbons (e.g., having 8 or more carbon atoms such as, e.g., ≥C10, ≥C12, ≥C15, ≥C20, ≥C30), based on the total non-volatile weight of the ingredients used to make the UC-functional polymer.

It is contemplated that in certain embodiments, the UC-functional polymer may include some long-chain hydrocarbons having 12 or less carbon atoms such as, for examples, sebacic acid.

Similarly, presently preferred coating compositions of the invention are preferably free or appreciably free of fatty acids and oils. Preferred coating compositions include no more than 20 wt-%, more preferably no more than 10 wt-%, and even more preferably no more than 5 wt-% of oils and fatty acids, based on the total nonvolatile weight of the coating composition.

In presently preferred embodiments, the UC-functional polymer is not an alkyd resin.

Coating compositions of the invention may include any suitable amount of UC-functional polymer to produce the desired result. In preferred embodiments, the coating composition includes from about 50 to about 100 wt-% of UC-functional polymer, more preferably at least about 60 wt-% of UC-functional polymer, and even more preferably at least about 70 wt-% of UC-functional polymer, based on the total nonvolatile weight of the coating composition. Preferably, the coating compositions include less than about 99, more preferably less than about 95, and even more preferably less than about 80 wt-% of UC-functional polymer, based on the total nonvolatile weight of the coating composition.

Preferred UC-functional polymers and/or coating compositions of the invention are preferably substantially free, more preferably essentially free, even more preferably essentially completely free, and optimally completely free of mobile bisphenol A (BPA) and aromatic glycidyl ether compounds (e.g., diglycidyl ethers of bisphenol (BADGE), diglycidyl ethers of bisphenol F (BFDGE), and epoxy novalacs). In certain preferred embodiments, the UC-functional polymer and/or coating composition of the inventions are preferably substantially free, more preferably essentially free, even more preferably essentially completely free, and optimally completely free of bound BPA and aromatic glycidyl ether compounds (e.g., BADGE, BFDGE and epoxy novalacs).

In some embodiments, the UC-functional polymer and/or coating composition is at least substantially "epoxy-free," more preferably "epoxy-free." The term "epoxy-free," when used herein in the context of a polymer, refers to a polymer that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments. The coating composition of the invention is also preferably at least substantially epoxy-free, more preferably epoxy-free.

In some embodiments, the UC-functional polymer is "PVC-free," and preferably the coating composition is also "PVC-free." That is, each composition preferably contains less than 2 wt-% of vinyl chloride materials, more preferably less than 0.5 wt-% of vinyl chloride materials, and even more preferably less than 1 ppm of vinyl chloride materials.

UC functionality may be incorporated into the polymer of the invention using any suitable means. For example, the functionality may be provided by either of the following non-limiting approaches: (A) forming a polymer from a mixture of reactants including one or more reactants having a UC group or (B) modifying a preformed oligomer or polymer to include a UC group.

Non-limiting examples of reactants having a UC group include UC-functional reactants having one or more active hydrogen groups such as, for example, acids or anhydrides (e.g., nadic acid or anhydride, methyl-nadic acid or anhydride, tetrahydrophthalic acid or anhydride, methyltetrahydrophthalic acid or anhydride, derivatives thereof, and mixtures thereof). UC-functional anhydrides are presently preferred, with anhydrides having an unsaturated bicyclic group being particularly preferred. Non-limiting examples of other suitable active hydrogen groups include groups having a hydrogen attached to an oxygen (O), sulfur (S), and/or nitrogen (N) atom as in the groups —OH, —COOH, —SH, =NH, and NH$_2$.

A non-limiting example of the above approach (B) includes the steps of:
1. providing a polymer (e.g., a polyester polymer) having reactive functional groups capable of participating in a step-growth reaction such as, for example, carboxylic, hydroxyl, amine, carbonate ester, isocyanate groups, or mixtures thereof;
2. providing a compound having (i) a UC group and (ii) a functional group capable of reacting with the aforementioned functional group of the polymer to form a step-growth linkage such as, for example, an ester, amide, urethane, urea, urethane, or carbonate ester linkage; and
3. reacting the polymer and the aforementioned compound to form a polymer including a UC group.

Another non-limiting example of approach (B) above includes providing a preformed unsaturated oligomer or polymer and using a Diels-Alder reaction to modify the oligomer or polymer (e.g., using cyclopentadiene or dicyclopentadiene, or a derivative thereof as the conjugated diene component) to include an unsaturated bicyclic group. Materials and methods for producing a bicyclic Diels-Alder reaction product are discussed in WO 2008/124682. Non-limiting examples of other useful Diels-Alder reactants (e.g., as the conjugated diene component) may include anthracene, cyclohexadiene, cyclopentadiene (including, e.g., 1-alkyl cyclopentadienes or 2-alkyl cyclopentadienes), furan, thiophene, and combinations or derivatives thereof.

Maleic anhydride and maleic acid are examples of preferred compounds for incorporating unsaturation into an oligomer or polymer for purposes of participating in a Diels-Alder reaction (e.g., with a conjugated diene component such as cyclopentadiene, dicyclopentadiene, and/or a variant or derivative thereof) to provide an unsaturated at least bicyclic group. While not intending to be bound by any theory, it is believed that maleic acid and maleic anhydride are particularly strong dienophiles, which allows the Diels-Alder reaction to be conducted at a lower temperature (e.g., from about 150 to about 200° C. as opposed to, e.g., from 260 to 280° C. as may be required for unsaturated fatty acids or oils), which may be beneficial in certain embodiments. In some embodiments, it is preferred that 1 mole or less of the conjugated diene component (e.g., cyclopentadiene), or 0.5 moles or less in the case of dicyclopentadiene, be used per 1 mole of unsaturated monomer blocks present in the oligomer or polymer.

In some embodiments, the coating composition of the present invention prior to cure (e.g., the liquid coating composition), includes less than 1,000 parts-per-million ("ppm"), preferably less than 200 ppm, and more preferably less than 100 ppm of low-molecular weight (e.g., <500 g/mol, <200 g/mol, <100 g/mol, etc.) ethylenically unsaturated compounds. Examples of such low-molecular weight ethyenically unsaturated compounds include any of the low-molecular weight conjugated diene components referenced herein such as, for example, anthracene, cyclohexadiene, cyclopentadiene, dicyclopentadiene, furan, thiophene, or a derivative thereof.

In some embodiments, it may be advantageous to provide a polymer polyol such as, for example, a polyester polyol having an Mn from about 500 to about 5,000 and react the polymer polyol with a dianhydride to upgrade the molecular weight. In certain embodiments, the mole ratio of polymer polyol (e.g., polyester polyol) to dianhydride is from about 5:1 to about 50:1, and more preferably from about 15:1 to about 25:1. The reaction is preferably controlled to avoid gelling. For example, the reaction temperature is preferably maintained at a temperature of less than about 150° C. (more preferably from about 90° C. to about 120° C.) to avoid gelling. Non-limiting examples of suitable dianhydrides include pyromellitic dianhydride, naphthalene tetracarboxylic dianhydride, benzophenone tetracarboxylic dianhydride, biphenyl tetracarboxylic dianhydride, butane tetracarboxylic dianhydride, cyclobutane tetracarboxylic dianhydride, cyclopentane tetracarboxylic dianhydride, and combinations thereof. In certain embodiments, the UC-functional polymer of the invention includes one or more dianhydrides in an amount from about 0.5 to about 70 wt-%, more preferably from about 2 to about 40 wt-%, and even more preferably from about 3 to about 10 wt-%, based on the total nonvolatile weight of reactants.

In some polyester-based embodiments, the coating composition of the invention can include one or more saturated or unsaturated polyester polymers in addition to a UC-functional polyester polymer of the invention. In some such embodiments, at least a majority (e.g., >50 wt-%, >60 wt-%, >75 wt-%, >90 wt-%, etc.), and more preferably all, or substantially all, of the total amount of polyester polymers included in the coating composition are UC-functional polyester polymers.

In some embodiments, the coating composition of the invention is free or substantially free (e.g., contains less than about 1 wt-%, based on solids) of one or both of acrylic resins or acrylated polyester resins.

When present, the concentration of one or more optional crosslinkers in the coating composition may vary depending upon the desired result. For example, in some embodiments, the coating composition may contain from about 0.01 to about 50 wt-%, more preferably from about 5 to about 50 wt-%, even more preferably from about 10 to about 40 wt-%, and optimally from about 15 to about 30 wt-% of one or more crosslinkers, by weight of nonvolatile material in the coating composition.

Any suitable crosslinker or combination of crosslinkers can be used. For example, phenolic crosslinkers (e.g., phenoplasts), amino crosslinkers (e.g., aminoplasts), blocked isocyanate crosslinkers, epoxy-functional crosslinkers, and combinations thereof, may be used. Preferred crosslinkers are at least substantially free, more preferably completely free, of bound BPA and aromatic glycidyl ethers.

Examples of suitable phenolic crosslinkers include the reaction products of aldehydes with phenols. Formaldehyde and acetaldehyde are preferred aldehydes. Non-limiting examples of suitable phenols that can be employed include phenol, cresol, p-phenylphenol, p-tert-butylphenol, p-tert-amylphenol, cyclopentylphenol, cresylic acid, BPA (not presently preferred), and combinations thereof.

Resole-type phenolic crosslinkers are presently preferred for certain food or beverage coating applications and, in particular, for food-contact coatings. While not intending to be bound by any theory, cured packaging coatings formulated using a UC-functional polymer of the invention and one or more resole-type phenolic crosslinkers (with or without additional crosslinkers such as, e.g., non-resole phenolic crosslinkers, amino crosslinkers, and/or blocked isocyanate) have been observed to exhibit superior coating properties relative to comparable cured packaging coatings formulated without resole-type phenolic crosslinkers. In preferred embodiments, upon curing of the coating, the resole-type phenolic crosslinker is believed to form a covalent bond with a UC group of the UC-functional polymer, resulting in the formation of a crosslinked polymer network including both the phenolic crosslinker and the UC-functional polymer. While not intending to be bound by any theory, this is believed to be responsible, at least in part, for the enhanced coating properties exhibited by certain preferred packaging coatings of the invention relative to certain conventional packaging coatings containing, for example, polyester and phenolic resins that do not form, or do not appreciably form, such a polymer network with each other.

Some preferred embodiments of the coating composition of the invention include (i) a UC-functional polymer, more preferably a UC-functional polyester polymer having unsaturated at least bicyclic groups (more preferably bicyclic UC groups) and (ii) at least one crosslinker in the form of a resole phenolic crosslinker. While not intending to be bound by any theory, the UC group and the resole phenolic crosslinker are believed to react with one another during coating cure to form a covalent linkage between the UC-functional polymer and the resole phenolic crosslinker.

While not intending to be bound by any theory, a simplified Diagram (I) is provided below depicting the reaction that is believed to occur between the UC group and a resole phenolic under suitable reaction conditions.

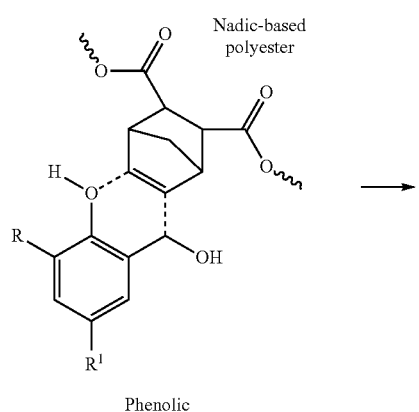

Nadic-based polyester

Phenolic

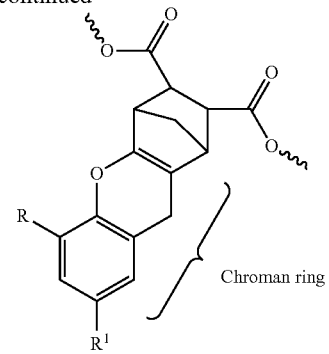

Chroman ring

In the above Diagram (I), the dotted lines are included to illustrate the proposed reaction mechanism; R and R' depict other structural portions of the phenolic crosslinker; and a backbone bicyclic UC group (and more specifically a backbone norbornyl group) is included as an illustrative UC group. As shown in Diagram (I), two covalent attachments are believed to be formed and are believed to be present in a so called "Chroman Ring", which includes the aromatic ring of the phenolic crosslinker and the ring that is believed to be formed between the phenolic aromatic group and the UC group. Thus, in some embodiments, it is believed that two covalent linkages are formed between the UC group and the phenolic crosslinker with one being an ether linkage group and the other a hydrocarbyl linkage group (e.g., a divalent methylene group). The Chroman Ring attaching group is believed to result in enhanced coating properties. In addition to bicyclic UC groups, it is believed that a Chroman Ring can also be formed when using monocyclic UC groups and/or tricyclic or higher polycyclic UC groups. It is also contemplated that certain open chain carbon-carbon double bonds may be capable of participating in a similar reaction with resole phenolic crosslinker to form covalent linkages between the binder polymer and the phenolic crosslinker.

Non-limiting examples of suitable resole phenolic crosslinkers include the DUREZ 33160 and 33162 products (each available from Durez Corporation, Addison, Tex.), the BAKELITE 6535 and 6470 products (each available from Hexion Specialty Chemicals GmbH), the PHENODUR PR 285 and PR 812 products (each available from CYTEC Surface Specialties, Smyrna, Ga.), and the SFC 112 and 142 products (each available from the SI Group, previously Schenectady), and mixtures thereof. In some embodiments, the coating composition includes, on a total solids basis, at least about 5, more preferably at least about 10, and even more preferably at least about 15 wt-% of phenolic crosslinker. Preferably, some or all of the phenolic crosslinker is resole phenolic crosslinker. A resole phenolic typically includes at least one methylol group or at least one group derived from a methylol group such as, for example, a butylated methyol group. In contrast, a novolac phenolic does not include a methylol group or a group derived therefrom.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1125, CYMEL 1131, CYMEL 5010 and MAPRENAL MF 980 (all available from Cytec Industries Inc., West Patterson, N.J.), and URAMEX BF 892 (available from DSM Netherlands).

Non-limiting examples of blocked isocyanate crosslinkers include aliphatic and/or cycloaliphatic blocked polyisocyanates such as HDI (hexamethylene diisocyanate), IPDI (isophorone diisocyanate), TMXDI (bis[4-isocyanatocyclohexyl]methane), $H_{12}MDI$ (tetramethylene-m-xylidene diisocyanate), TMI (isopropenyldimethyl-benzylisocyanate) and dimers or trimers thereof. Suitable blocking agents include, for example, n-butanone oxime, ϵ-caprolactam, diethyl malonate, and secondary amines. Non-limiting examples of suitable commercially available blocked isocyanate crosslinkers include VESTANAT B 1358 A, VESTANAT EP B 1186 A, VESTANA EP B 1299 SV (all available from Degussa Corp., Marl, Germany); and DESMODUR VPLS 2078 and DESMODURBL 3175 (available from Bayer A.G., Leverkusen, Germany). In some embodiments, blocked isocyanates may be used that have an Mn of at least about 300, more preferably at least about 650, and even more preferably at least about 1,000.

Certain conventional polyester coatings are crosslinked using reactive diluents such as, for example, styrene. Preferred coating compositions of the invention are free, or at least substantially free, of such reactive diluent crosslinker, which may be unsuitable for food-contact applications. Preferred crosslinkers have an Mn of at least about 500.

One preferred optional ingredient is a catalyst to increase the rate of cure and/or the extent of crosslinking Non-limiting examples of catalysts, include, but are not limited to, strong acids (e.g., dodecylbenzene sulphonic acid (DDBSA), available as CYCAT 600 from Cytec, methane sulfonic acid (MSA), p-toluene sulfonic acid (pTSA), dinonylnaphthalene disulfonic acid (DNNDSA), and triflic acid), quaternary ammonium compounds, phosphorous compounds, tin and zinc compounds, and combinations thereof. Specific examples include, but are not limited to, a tetraalkyl ammonium halide, a tetraalkyl or tetraaryl phosphonium iodide or acetate, tin octoate, zinc octoate, triphenylphosphine, and similar catalysts known to persons skilled in the art. If used, a catalyst is preferably present in an amount of at least 0.01 wt-%, and more preferably at least 0.1 wt-%, based on the weight of nonvolatile material in the coating composition. If used, a catalyst is preferably present in an amount of no greater than 3 wt-%, and more preferably no greater than 1 wt-%, based on the weight of nonvolatile material in the coating composition.

In some embodiments, the UC-functional polymer of the invention may self-crosslink when cured under suitable coating cure conditions. An efficacious amount of one or more metal driers may be included in the coating composition (with or without crosslinker) to facilitate the formation of crosslinks between the UC-groups. Non-limiting examples of suitable metal driers may include aluminum (Al), antimony (Sb), barium (Ba), bismuth (Bi), calcium (Ca), cerium (Ce), chromium (Cr), cobalt (Co), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), or any other suitable rare earth metal or transition metal, as well as oxides, salts (e.g., acid salts such as octoates, naphthenates, stearates, neodecanoates, etc.) or complexes of any of these, and mixtures thereof.

If desired, coating compositions of the invention may optionally include other additives that do not adversely affect the coating composition or a cured coating resulting therefrom. The optional additives are preferably at least substantially free of mobile and/or bound BPA and aromatic glycidyl ether compounds (e.g., BADGE, BFDGE and epoxy novalac compounds) and are more preferably completely free of such compounds. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, additional polymers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents or combinations thereof. Each optional ingredient can be included in a sufficient amount to serve its intended purpose, but preferably not in such an amount to adversely affect a coating composition or a cured coating resulting therefrom.

Any suitable carrier may be used to prepare coating compositions of the invention. Suitable carriers include carrier liquids such as organic solvents, water, and mixtures thereof. Preferably, the liquid carrier(s) are selected to provide a dispersion or solution of the UC-functional polymer of the invention for further formulation. Suitable organic solvents include aliphatic hydrocarbons (e.g., mineral spirits, kerosene, high flashpoint VM&P naphtha, and the like); aromatic hydrocarbons (e.g., benzene, toluene, xylene, solvent naphtha 100, 150, 200 and the like); alcohols (e.g., ethanol, n-propanol, isopropanol, n-butanol, iso-butanol and the like); ketones (e.g., acetone, 2-butanone, cyclohexanone, methyl aryl ketones, ethyl aryl ketones, methyl isoamyl ketones, and the like); esters (e.g., ethyl acetate, butyl acetate and the like); glycols (e.g., butyl glycol); glycol ethers (e.g., ethylene glycol monomethyl ether, ethylene glycol monoethyl ether, ethylene glycol monobutyl ether, propylene glycol monomethyl ether, methoxypropanol and the like); glycol esters (e.g., butyl glycol acetate, methoxypropyl acetate and the like); and mixtures thereof.

If present, the amount of liquid carrier included in the coating composition will vary, for example, depending upon the application method and the desired amount of solids. Preferred embodiments of the coating composition include at least 30 wt-% of liquid carrier, more typically at least 45 wt-% of liquid carrier. In such embodiments, the coating composition will typically include less than 85 wt-% of liquid carrier, more typically less 80 wt-% of liquid carrier.

In some embodiments, the coating composition is a solvent-based coating composition that preferably includes no more than a de minimus amount (e.g., 0 to 2 wt-%) of water. In other embodiments, the coating composition can include a substantial amount of water.

In some embodiments, the coating composition of the invention is a water-based varnish. As already discussed, the UC-functional polymer of the invention may include water-dispersing groups such as salt groups. In some embodiments, preferably at least about 50 wt-% of the liquid carrier system is water, more preferably at least about 60 wt-% is water, and even more preferably at least about 75 wt-% is water. Certain coating compositions of the invention include at least about 10 wt-% of water, more preferably at least about 20 wt-% of water, and even more preferably at least about 40 wt-% of water (in some embodiments about 50 wt-% or more of water), based on the total weight of the coating composition.

Coating compositions of the invention may be prepared by conventional methods in various ways. For example, the coating compositions may be prepared by simply admixing the UC-functional polymer, optional crosslinker and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, the UC-functional polymer, optional crosslinker, and any other optional ingredients, in any desired order, with sufficient agitation. An additional amount of carrier liquid may be added to the coating compositions to adjust the amount of nonvolatile material in the coating composition to a desired level.

The total amount of solids present in coating compositions of the invention may vary depending upon a variety of factors including, for example, the desired method of application. Presently preferred coating compositions include at least about 30, more preferably at least about 35, and even more preferably at least about 40 wt-% of solids, based on the total weight of the coating composition. In certain preferred embodiments, the coating composition includes less than about 80, more preferably less than about 70, and even more preferably less than about 65 wt-% of solids, based on the total weight of the coating composition. The solids of the coating composition may be outside the above ranges for certain types of applications. For example, for inside spray applications of the coatings compositions, the wt-% solids may be as low as about 20 wt-%.

Cured coatings of the invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to products such as food or beverage products. The coatings may be applied to any suitable surface, including inside surfaces of containers, outside surfaces of containers, container ends, and combinations thereof.

The coating composition of the invention can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating.

The coating composition can be applied on a substrate prior to, or after, forming the substrate into an article. In some embodiments, at least a portion of a planar substrate is coated with one or more layers of the coating composition of the invention, which is then cured before the substrate is formed into an article (e.g., via stamping, drawing, or draw-redraw).

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the invention is a heat-curable coating composition.

The curing process may be performed at any suitable temperature, including, for example, temperatures in the range of about 180° C. to about 250° C. If metal coil is the substrate to be coated, curing of the applied coating composition may be conducted, for example, by subjecting the coated metal to an elevated temperature environment of about 210° C. to about 232° C. for a suitable time period (e.g., about 15 to 30 seconds). If metal sheeting is the substrate to be coated (e.g., such as used to make three-piece food cans), curing of the applied coating composition may be conducted, for example, by subjecting the coated metal to an elevated temperature environment of about 190° C. to about 210° C. for a suitable time period (e.g., about 8 to about 12 minutes).

Coating compositions of the invention may be useful in a variety of coating applications. As previously discussed, the coating compositions are particularly useful as adherent coatings on interior or exterior surfaces of metal packaging containers. Non-limiting examples of such articles include closures (including, e.g., internal surfaces of twist-off caps for food and beverage containers); internal crowns; two and three-piece cans (including, e.g., food and beverage containers); shallow drawn cans; deep drawn cans (including, e.g., multi-stage draw and redraw food cans); can ends (including, e.g., easy open can ends); monobloc aerosol containers; and general industrial containers, cans, and can ends.

Preferred coating compositions of the invention are particularly suited for use on interior or exterior surfaces of metal food or beverage containers, including as food-contact coatings. Preferably, the cured coatings are retortable when employed in food and beverage container applications. Preferred cured coatings of the invention are capable of withstanding elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Some examples of such aggressive food or beverage products may include meat-based products, milk-based products, fruit-based products, energy drinks, and acidic or acidified products.

The coating composition of the invention is particularly suitable for use as a coating on an interior surface of the sidewall of a three-piece food can. The coating composition is typically applied to a metal sheet which is then typically cured prior to fabricating the coated sheet into the sidewall of a three-piece food can.

Some additional non-limiting embodiments of the invention are provided below.

A. A composition comprising: a polymer (i) having a backbone or pendant UC group with a double bond, more preferably a carbon-carbon double bond, located between atoms of a ring, and (ii) preferably having an iodine value of at least about 10, more preferably at least about 20, even more preferably at least about 35, and optimally at least about 50; and an optional crosslinker.

B. An article, comprising: a metal substrate having the composition of Embodiment A applied on at least a portion of a major surface of the metal substrate.

C. A method comprising: providing the composition of Embodiment A, and applying the composition on at least a portion of a metal substrate.

D. Any of Embodiments A-C, wherein the one or more UC groups constitute at least about 5 wt-% of the polymer, more preferably at least about 15 wt-%, and even more preferably at least 30 wt-%, based on the total weight of UC-functional monomers included in the polymer relative to the total weight of the polymer.

E. Any of Embodiments A-D, wherein the UC group comprises an unsaturated group that is at least bicyclic (e.g., bicyclic, tricylic, or higher order polycyclic group), and more preferably bicyclic.

F. The composition, article, or method of Embodiment E, wherein the bicyclic group comprises a structure represented by the nomenclature expression bicyclo[x.y.z]alkene, wherein: x is 2 or more, and y and z are each at least 1.

G. The composition, article, or method of Embodiment E, wherein the unsaturated bicyclic group comprises bicyclo[2.1.1]hexene, bicyclo[2.2.1]heptene, bicyclo[2.2.1]heptadiene, bicyclo[2.2.2]octene, bicyclo[2.2.2]octadiene, or a mixture thereof.

H. Any of Embodiments A-G, wherein the UC group is provided by nadic acid, nadic anhydride, methyl-nadic acid, methyl-nadic anhydride, a derivative thereof, or a mixture thereof.

I. Any of Embodiments A-E, wherein the UC group comprises an unsaturated strained ring group.

J. Any of Embodiments A-I, wherein the UC group includes at least one allylic hydrogen.

K. Any of Embodiments A-J, wherein the polymer has a polymer backbone that includes at least one heteroatom and, more preferably, the backbone comprises a step-growth or condensation backbone.

L. Any of Embodiments A-K, wherein the backbone of the polymer comprises a polyester backbone, a polyether backbone, a polyurethane backbone, or a copolymer backbone thereof (e.g., a polyester-urethane backbone, a polyester-ether backbone, etc.).

M. Any of Embodiments A-L, wherein the crosslinker comprises an amino crosslinker, an anhydride-based crosslinker, a blocked isocyanate crosslinker, a phenolic crosslinker, an epoxy-functional crosslinker or a mixture thereof.

N. Any of Embodiments A-M, wherein the composition includes at least 5 wt-%, more preferably at least 10 wt-%, and even more preferably at least 15 wt-%, by total weight solids, of the crosslinker.

O. Any of Embodiments A-N, wherein the composition includes at least 50% by weight of binder polymer, and more preferably at least 60 wt-% or at least 70 wt-%.

P. Any of Embodiments A-O, wherein the crosslinker comprises a phenolic crosslinker, more preferably a resole phenolic crosslinker Q. Any of Embodiments A-P, wherein the composition further comprises a liquid carrier.

R. Any of Embodiments A-Q, wherein the composition comprises a cured coating composition, more preferably a crosslinked coating composition.

S. The composition, article, or method of Embodiment R, wherein the crosslinker comprises a phenolic crosslinker, more preferably a resole phenolic crosslinker, which is covalently attached to the polymer through a linkage resulting from the reaction of the UC group and the phenolic crosslinker.

T. Any of Embodiments B-S, wherein the metal substrate comprises a substrate of a metal food or beverage can or portion thereof.

U. Any of Embodiments A-T, wherein the polymer comprises a water-dispersible polymer, more preferably a water-dispersible polymer having a sufficient number of salt groups to form a stable aqueous solution or dispersion.

V. Any of Embodiments A-T, wherein the composition comprises a solvent-based composition.

W. Any of Embodiments A-V, wherein the polymer comprises a polyester binder polymer (preferably present in the coating composition, based on total coating solids, in an amount from 50-95 wt-%) and the crosslinker comprises a phenolic crosslinker, more preferably a resole phenolic crosslinker.

TEST METHODS

Unless indicated otherwise, the following test methods were utilized in the Examples that follow.

A. Solvent Resistance Test

The extent of "cure" or crosslinking of a coating is measured as a resistance to solvents, such as methyl ethyl ketone (MEK) or isopropyl alcohol (IPA). This test is performed as described in ASTM D5402-93. The number of double-rubs (i.e., one back-and-forth motion) is reported. Preferably, the MEK solvent resistance is at least 30 double rubs.

B. Adhesion Test

Adhesion testing was performed to assess whether the coating compositions adhere to the coated substrate. The Adhesion Test was performed according to ASTM D3359-Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

C. Blush Resistance Test

Blush resistance measures the ability of a coating to resist attack by various solutions. Typically, blush is measured by the amount of water absorbed into a coated film. When the film absorbs water, it generally becomes cloudy or looks white. Blush was measured visually using a scale of 0-10 where a rating of "10" indicates no blush, a rating of "5" indicates slight whitening of the film, and a rating of "0" indicates severe whitening of the film.

D. Water Pasteurization (Also Referred to as Water Retort)

Water retort is a measure of the coating integrity of the coated substrate after exposure to heat and pressure with a liquid such as water. Water retort performance is not necessarily required for all food and beverage coatings, but is desirable for some product types that are packed under retort conditions. Testing is accomplished by subjecting the substrate to heat ranging from 105-130° C. and pressure of 15 psi (~1.05 kg/cm$^2$) for a period of 15 to 90 minutes. The coated substrate was then tested for adhesion and blush as described above.

E. Iodine Value

Prepare Starch Solution by dissolving 5 grams of soluble starch with 100 milliliters (ml) of deionized (D.I.) water. Add 400 ml of boiling D.I. water, stir until clear, and allow to cool. This solution will not keep for more than a few days and should be made fresh as needed. Prepare Potassium Iodide Solution by dissolving 150 grams of Potassium Iodide in 1,000 ml of D.I. water.

A small portion of the sample under test shall be weighed by difference into an Erlenmeyer iodine flask, the amount of sample taken being such that from 10 to 30% of an iodine solution (Wijs Iodine Monochloride Solution—Fisher Scientific Co. Cat. No. SI106-4) will be absorbed. Pipette 20 ml of chloroform into each sample flask. Stopper the flasks, add a Teflon stirring bar and stir until the samples dissolve. Prepare two flasks for blanks by pipetting 20 ml of chloroform into separate flasks. Pipette into each flask (2 flasks for each sample and 2 flasks for blanks) 25 ml of the iodine solution.

Stopper the flasks, stir for 30 seconds, then let stand with occasional swirling for 30 minutes in a dark place at room temperature. At the end of the standing time, pipette 20 ml. of Potassium Iodide Solution and 80 ml of D.I. water, stopper and stir. Add 2 ml of the Starch Solution and immediately titrate with 0.1N sodium thiosulfate (Fisher Scientific Cat. No. SS368-1).

Calculate the iodine value as the difference in the average volume (in milliliters) of 0.1N sodium thiosulfate required for the blank less the average volume (in milliliters) required for the sample, multiplied by 1.269 and divided by the sample weight in grams.

The iodine value is calculated using the following equation: [(Average volume blank−Average volume sample)× 1.269]/[Sample Weight in grams]. The iodine value is reported as the centigrams of iodine absorbed per 1 gram of the material.

The iodine values provided in the Examples Section were determined using this methodology.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Example 1

UC-Functional Polyesters

Run 1: Polyester Containing Nadic Anhydride

Cyclohexane-1,4-dimethanol (124.1 g of a 90% solution in water), 2-methyl-1,3-propanediol (64.6 g), terephthalic acid (42.3 g), isophthalic acid (84.4 g), and dibutyltin oxide (0.40 g) were charged to a 1-liter, 4-neck round bottom flask fitted with a mechanical stirrer, a thermocouple, a packed column (topped with a Dean-Stark trap and condenser), and a stopper for future additions. The contents of the flask were heated slowly (so that the temperature of the distillate did not exceed 100° C.) to 230° C., and held until the acid number dropped to 0.4 mg KOH/g resin. The temperature was then reduced to 180° C., and cyclohexane-1,4-dicarboxylic acid (63.3 g) and nadic anhydride (50.2 g) were added to the flask. The temperature was raised to 220° C. and held until the resin cleared. The temperature was dropped to 180° C., xylene (19.5 g) was added to the flask, the packed column was removed, and the trap was pre-filled with xylene in preparation for an azeotrope reflux. The temperature was then returned to 220° C. (or as restricted by reflux) and held until the acid number dropped below 5 mg KOH/g resin. At this point, the resin was cooled to 170° C. and cut to 50% solids with AROMATIC 150 solvent (166.8 g) and cyclohexanone (166.8 g). Once uniform, the resin was fully cooled and discharged.

Run 2: Polyester Containing Nadic Anhydride and Pyromellitic Dianhydride (PMDA)

Cyclohexane-1,4-dimethanol (626.2 g of a 90% solution in water), 2-methyl-1,3-propanediol (325.8 g), terephthalic acid (158.1 g), isophthalic acid (315.8 g), and dibutyltin oxide (1.9 g) were charged to a 5-liter, 4-neck round bottom flask fitted with a mechanical stirrer, a thermocouple, a packed column (topped with a Dean-Stark trap and condenser), and a stopper for future additions. The contents of the flask were heated slowly (so that the temperature of the distillate did not exceed 100° C.) to 232° C. under a nitrogen atmosphere, and held until the acid number dropped to 1.0 mg KOH/g resin. The temperature was then reduced to 170° C., and nadic anhydride (585.0 g) was added to the flask. Following a 1-hour hold at 170° C., xylene (154.9 g) was added to the flask, the packed column was removed, and the trap was pre-filled with xylene in preparation for an azeotrope reflux. The temperature was then raised to 220° C. (or as restricted by reflux) and held until the acid number dropped below 2 mg KOH/g resin. At this point, the resin was cooled to 170° C. and cut to 60% solids with cyclohexanone (1032.5 g). The resulting resin was stirred until uniform and 2697.0 grams were transferred to a 5-liter flask fitted with a mechanical stirrer, a thermocouple, a condenser, and a stopper for sampling or additions. Pyromellitic dianhydride (86.9 g) was added to the flask, and the contents were heated to 120° C. under a nitrogen atmosphere. After a 4-hour hold at 120° C., cyclohexanone (222.0 g) and AROMATIC 150 solvent (1149.0 g) were added to achieve a 41% solids solution, and the resin was cooled to room temperature. The resulting resin had an acid number of 30.2 mg KOH/g resin, a hydroxyl number of 26.4 mg KOH/g resin, and a Tg of 68° C.

Run 3: Water-Based Polyester Containing Nadic Anhydride and PMDA

Cyclohexane-1,4-dimethanol (1284.4 g of a 90% solution in water), 2-methyl-1,3-propanediol (668.0 g), terephthalic acid (324.0 g), isophthalic acid (648.0 g), and dibutyltin oxide (2.5 g) were charged to a 5-liter, 4-neck round bottom flask fitted with a mechanical stirrer, a thermocouple, a packed column (topped with a Dean-Stark trap and condenser), and a stopper for future additions. The contents of the flask were heated slowly (so that the temperature of the distillate did not exceed 100° C.) to 232° C. under a nitrogen atmosphere, and held until the acid number dropped to 0.6 mg KOH/g resin. The temperature was then reduced to 170° C., and nadic anhydride (1200.0 g) was added to the flask. Following a 1-hour hold at 170° C., xylene (254.0 g) was added to the flask, the packed column was removed, and the trap was pre-filled with xylene in preparation for an azeotrope reflux. The temperature was then raised to 220° C. (or as restricted by reflux) and held until the acid number dropped below 2 mg KOH/g resin. At this point, the resin was cooled to 170° C. and cut to 81% solids with cyclohexanone (659.0 g). The resulting resin was stirred until uniform and 2175.0 grams were transferred to a 5-liter flask fitted with a mechanical stirrer, a thermocouple, a condenser, and a stopper for sampling or additions. Pyromellitic dianhydride (117.6 g) was added to the flask, and the contents were heated to 120° C. under a nitrogen atmosphere. After a 4-hour hold at 120° C., butanol (405.0 g) and butyl cellosolve (405.0 g) were added to achieve a 58% solids solution, and the resin was cooled to room temperature. The resulting resin had an acid number of 23.6 mg KOH/g resin. 384.9 grams of the resulting solution were combined with dimethylethanolamine (6.7 g) and heated to 60° C. in a 1-liter round bottom flask under mechanical stirring. D.I. water (248.4 g) was added to the flask over 30 minutes (resulting in a 35% solids) while the temperature of the batch was allowed to cool to room temperature.

Run 4: Polyester Containing Unsaturated at Least Bicyclic Groups Formed Via Diels-Alder Reaction)

Cyclohexane-1,4-dimethanol (267.7 g of a 90% solution in water), 2-methyl-1,3-propanediol (101.0 g), terephthalic acid (60.8 g), isophthalic acid (121.5 g), and dibutyltin oxide (0.82 g) were charged to a 2-liter, 4-neck round bottom flask fitted with a mechanical stirrer, a thermocouple, a packed column (topped with a Dean-Stark trap and condenser), and a stopper for future additions. The contents of the flask were heated slowly (so that the temperature of the distillate did not exceed 100° C. at the top of packed column) to a batch temperature of 235° C. under a nitrogen atmosphere. The temperature was held at 235° C. until the acid number dropped to 0.5 mg KOH/g resin. The temperature was then reduced to 160° C., and maleic anhydride (134.5 g) and xylene (66.2 g) were added to the flask. The packed column was removed, and then the Dean-Stark trap was fitted directly to the flask and pre-filled with xylene in preparation for an azeotrope reflux. The temperature was returned to approximately 200° C. and held until the acid number dropped below 3 mg KOH/g resin. At this point, the resin was cooled to 160° C., and dicyclopentadiene (95.5 g, 95% pure) was added slowly to the flask over 1 hour. The resin was held for 5 hours at 160° C., and then 200.0 g of AROMATIC 150 was added slowly. The resin was returned to reflux, and any distillate was collected in the Dean-Stark trap. Once the temperature of the distillate reached 180° C., the resin was cooled to 180° C. and an additional 220.0 g of AROMATIC 150 was added slowly to the flask. Upon further cooling to 120° C., Pyromellitic dianhydride (37.2 g) was added to the flask and the contents stirred for four hours at 120° C. Cyclohexanone (398.0 g) was added slowly, and the resin was cooled to room temperature. The resulting resin had an acid number of 27.4 mg KOH/g resin, a hydroxyl number of 17.6 mg KOH/g resin, and a Gardner-Holt viscosity of Z1 at 44.5% solids.

Example 2

Coating Compositions

Run 1

A solvent-based coating composition was prepared that included, based on total coatings solids, 75 wt-% of the polyester resin of Example 1, Run 1 and 25 wt-% of GPRI 7590 resole phenolic crosslinker (Georgia-Pacific). The coating composition was approximately 40 wt-% solids.

Run 2

A solvent-based coating composition was prepared that included, based on total coatings solids, 75 wt-% of the polyester resin of Example 1, Run 2 and 25 wt-% of GPRI 7590 resole phenolic crosslinker (Georgia-Pacific). The coating composition was approximately 40 wt-% solids.

Comparative Run 3

A commercial solvent-based, epoxy-based coating composition including a phenolic crosslinker was provided as a control.

Example 3

Cured Coating Compositions

The coating compositions of Example 2 were applied to metal substrate and cured to form cured coatings. The results of coating performance tests performed on the cured coatings are provided below in Tables 1 and 2.

TABLE 1

Retort and Fabrication Properties

| Coating Composition | Example 2, Comparative Run 3 | Example 2, Run 1 | Example 2, Run 2 |
|---|---|---|---|
| Adhesion | 10 | 10 | 10 |
| MEK Resistance (double rubs) | 35 | >100 | >100 |
| Water Retort[1] | | | |
| Blush (L/V) | 10/10 | 10/10 | 10/10 |
| Adhesion (L/V) | 10/10 | 10/10 | 10/10 |
| Size 202 Sanitary Can End | | | |
| Crazing | None | None | None |
| Metal Exposure (milli-Amps)[2] | 6.4 | 2.8 | 7.4 |
| CuSO$_4$ Corrosion[3] | None | None | None |
| Size 206 Sanitary Can End | | | |
| Crazing | None | None | None |
| Metal Exposure (ma)[2] | 11.2 | 6.2 | 13.5 |
| CuSO$_4$ Corrosion[3] | None | None | None |

Bake: 10 minutes at a 400° F. (204° C.) peak metal temperature (PMT) in a gas-fired forced-draft box oven
Substrate: 0.25 75# ETP
Coating Wt.: 4.5-5.0 msi (milligrams per square inch); metric equivalent is 7-7.8 grams per square meter
Rating Scale: 0-10; 10 = No Failure
[1]60 minutes at 250° F. (121° C.) and 15 psi (~1.05 kg/cm$^2$) in distilled water pursuant to Test Method D; L/V = Liquid/Vapor phase
[2]Electrolyte-1% NaCl; Average of 4 ends
[3]Ends submersed for 10 minutes in CuSO$_4$/HCl solution.

TABLE 2

| | Corrosion Resistance | | | | | |
|---|---|---|---|---|---|---|
| | ETP | | | TFS | | |
| | Example 2, Comparative Run 3 | Example 2, Run 1 | Example 2, Run 2 | Example 2, Comparative Run 3 | Example 2, Run 1 | Example 2, Run 2 |
| 2% Salt/3% Acetic Acid Solution | | | | | | |
| Adhesion/Blush | 10/10 | 10/9 | 9/10 | 8/5 | 8/8 | 8/7 |
| Corrosion | 9 | 9 | 9 | 4 | 5 | 6 |

TABLE 2-continued

| | Corrosion Resistance | | | | | |
|---|---|---|---|---|---|---|
| | ETP | | | TFS | | |
| | Example 2, Comparative Run 3 | Example 2, Run 1 | Example 2, Run 2 | Example 2, Comparative Run 3 | Example 2, Run 1 | Example 2, Run 2 |
| 1% Lactic Acid Solution | | | | | | |
| Adhesion/Blush | 9/8 | 9/10 | 9/10 | 7/4 | 8/9 | 7/10 |
| Corrosion | 8 | 8 | 9 | 4 | 5 | 7 |
| 2% Salt Solution | | | | | | |
| Adhesion/Blush | 5/10 | 10/10 | 5/7 | 6/10 | 9/10 | 4/8 |
| Corrosion | 9 | 10 | 9 | 9 | 10 | 9 |

Testing conducted using size 202 sanitary can ends; Ends submersed in specified solution and retorted 60 minutes at 250° F. (121° C.) and 15 psi (~1.05 kg/cm²).
Bake: 10 minutes at a 400° F. (204° C.) PMT in a gas-fired forced-draft box oven
Substrates: 0.25 75# ETP and 75# TFS
Coating Wt.: 4.5-5.0 msi (milligrams per square inch); metric equivalent is 7-7.8 grams per square meter
Rating Scale: 0-10; 10 = No Failure Example 4

UC-Functional Polyurethane

Cyclohexane dimethanol (1449.7 g of a 90% solution in water), MP Diol (i.e., methylpropanediol) (722.5 g), terephthalic acid (293.3 g), isophthalic acid (578 g), maleic anhydride (808.4 g), dibutyl tin oxide (4.2 g) (FASTCAT 4201 product), and xylene (187 g) were added to a glass reaction flask equipped with a stirrer, nitrogen inlet and reflux condenser. The condenser was further equipped with a Dean-Stark flask to capture and quantify the water evolved during the reaction. The reactor was set for 230° C. After approximately 5 hours, the acid value of the resulting polyester polymer was approximately 0.5 mg KOH/g resin. The temperature of the reactor was reduced to approximately 160° C., at which point dicyclopentadiene ("DCPD") (546.4 g) was added. The reactor was held an additional 6 hours at 160° C. to complete the Diels-Alder reaction between the maleic unsaturation and the DCPD. The resulting structure is believed to resemble that of a material prepared from nadic anhydride. The resulting modified polyester polymer composition was 84% solids and had an acid value of 1.4 mg KOH/g resin and an OH value of 56.6 mg KOH/g resin.

The modified polyester composition (1044.3 g) was added to a new reaction flask (same configuration as described above), along with isophorone diisocyanate ("IPDI") (247.3 g) and dimethylol propionic acid (74.6 g). The temperature of the flask was maintained at about 100° C. and the reaction was continued for about 6 hours, at which point butanol (307 g), butyl cellosolve (307 g), and cyclohexanone (1587 g) were added to the flask. The resulting polyester-urethane polymer composition was 24% solids and had an acid value of 26.5 mg KOH/g resin.

Example 5

Coating Composition

The polyester-urethane polymer composition of Example 4 (100 g) was combined with a resole phenolic crosslinker resin (7.5 g). The resulting coating formulation had a ratio, on a weight basis, of 80% polyester-urethane polymer and 20% phenolic resin.

Example 6

Cured Coating Composition

A sample of the Example 5 coating composition was applied onto both commercially available ETP and tin-free steel TFS using a wound wire rod. The coated steel samples were baked about 12 minutes in a 402° F. (204° C.) oven to dry and cure the coating. Once dried and cured, the film weight of the coating was determined to be from about 4.5 to 5.0 mgs coating per square inch of coated substrate (metric equivalent is 7-7.8 grams per square meter). It was noted that the appearance of the coating was smooth and glossy and had a goldish tint. Samples of this coated substrate were fabricated into food can ends, with the coating composition of Example 5 oriented as the internal coating. In addition, an analogous set of control food can ends were prepared from tin-plated and tin-free steel coated with a conventional epoxy-based coating system that is currently used commercially as a high corrosion-resistant coating for the interior of food can bodies and ends. Samples of both the control and experimental ends were then subjected to a variety of coating property tests to evaluate the suitability of the coatings for use as food-contact coatings for food or beverage cans. The cured coating composition of Example 6 on ETP substrate exhibited good coating properties (e.g., comparable adhesion, blush resistance, stain resistance, and corrosion resistance as that of the commercial control). The cured coating composition of Example 6 on TFS substrate also exhibited good coating properties, although not quite as good as on ETP substrate (e.g., the adhesion and corrosion resistance were not as good).

The entire contents of copending application entitled POLYESTER COATING COMPOSITION by Hayes et al., filed on even date herewith, is incorporated by reference.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A coating composition comprising a water-based varnish that includes a water-dispersible polyester polymer having salt groups and a backbone or pendant unsaturated at least bicyclic group with a double bond located between carbon atoms of a ring.

2. The coating composition of claim 1, wherein the unsaturated at least bicyclic group comprises a structure represented by the nomenclature expression:

bicyclo[x,y,z]alkene;

wherein:
x is 2 or more,
y and z are each at least 1, and
the term "alkene" denotes that the bicyclic group includes one or more carbon-carbon double bonds.

3. The coating composition of claim 2, wherein the unsaturated at least bicyclic group comprises bicyclo[2.1.1]hexene, bicyclo[2.2.1]heptene, bicyclo[2.2.1]heptadiene, bicyclo[2.2.2]octene, bicyclo[2.2.2]octadiene, or a combination thereof.

4. The coating composition of claim 1, wherein the unsaturated at least bicyclic group was incorporated into the polymer using nadic acid, methyl-nadic acid, or an anhydride ahydride or derivative thereof.

5. The coating composition of claim 1, wherein the polyester polymer includes a plurality of the unsaturated at least bicyclic groups that constitute at least about 5 weight percent of the polyester polymer.

6. The coating composition of claim 1, wherein the polyester polymer has an iodine value of at least about 10.

7. The coating composition of claim 1, wherein the polyester polymer has a Tg of at least 25° C.

8. The coating composition of claim 1, wherein the polyester polymer has an acid number of at least 15.

9. The coating composition of claim 1, wherein the salt groups comprise neutralized acid or anhydride groups.

10. The coating composition of claim 1, wherein the polyester polymer includes at least 5 weight percent of aromatic groups.

11. The coating composition of claim 1, wherein the polyester polymer comprises a reaction product of ingredients including one or more of maleic acid or anhydride, and wherein a structural unit derived from maleic acid or anhydride includes the unsaturated at least bicyclic group.

12. The coating composition of claim 11, wherein the structural unit is a Diels-Alder reaction product.

13. The coating composition of claim 1, wherein the polyester polymer is formed from reactants including a dianhydride.

14. The coating composition of claim 13, wherein the dianhydride comprises pyromellitic dianhydride.

15. The coating composition of claim 1, wherein the coating composition includes a crosslinker.

16. The coating composition of claim 15, wherein the crosslinker comprises a resole phenolic crosslinker.

17. A coating composition, wherein the coating composition includes:
50 to 95 weight percent, based on nonvolatile weight, of a water-dispersible aromatic polyester polymer having a backbone or pendant unsaturated at least bicyclic group with a double bond located between carbon atoms of a ring; and
5 to 50 weight percent, based on nonvolatile weight, of a resole phenolic crosslinker; and
a liquid carrier that comprises at least 50 weight percent of water.

18. The coating composition of claim 17, wherein the unsaturated at least bicyclic group was incorporated into the polymer using nadic acid, methyl-nadic acid, or an anhydride or derivative thereof.

19. The coating composition of claim 18, wherein the polyester polymer is formed from reactants including a dianhydride.

20. A method, comprising:
providing a water-based varnish that includes a water-dispersible polyester polymer having salt groups and a backbone or pendant unsaturated at least bicyclic group with a double bond located between carbon atoms of a ring; and
applying the coating composition to at least a portion of a metal substrate of a food or beverage can or a portion thereof.

* * * * *